United States Patent [19]
Laakkonen et al.

[11] Patent Number: 5,718,751
[45] Date of Patent: Feb. 17, 1998

[54] ADHESIVE AGENT FOR ADHERING AN OBJECT TO ITS BASE

[75] Inventors: Jari Tapio Laakkonen; Jukka Juhani Suomalainen, both of Espoo; Mikko Kalevi Karvo; Rauno Juha Ensio Logren, both of Oulu, all of Finland

[73] Assignee: Okmetic Oy, Espoo, Finland

[21] Appl. No.: 793,241

[22] PCT Filed: Aug. 24, 1995

[86] PCT No.: PCT/FI95/00452

§ 371 Date: Apr. 7, 1994

§ 102(e) Date: Apr. 7, 1997

[87] PCT Pub. No.: WO96/06533

PCT Pub. Date: Mar. 7, 1996

[30] Foreign Application Priority Data

Aug. 29, 1994 [FI] Finland ................................... 943958

[51] Int. Cl.$^6$ .................................................. C09J 193/04
[52] U.S. Cl. ........................ 106/236; 106/237; 106/239
[58] Field of Search ............................ 106/236, 237, 106/239

[56] References Cited

U.S. PATENT DOCUMENTS 4,842,691  6/1989  Nakajima et al. ..................... 162/158

FOREIGN PATENT DOCUMENTS 1291596    2/1987  U.S.S.R. ................................ 106/237
FI95/00452 8/1995  WIPO ............................. A09J 193/04

*Primary Examiner*—David Brunsman
*Attorney, Agent, or Firm*—Smith-Hill and Bedell

[57] ABSTRACT

The invention relates to an adhesive agent for adhering an object produced in several stages to its base for the duration of at least one process step. According to the invention, the adhesive agent contains 20–50 parts by weight of modified tall oil rosin with an acid value within the region 115–145, and 48–80 parts by weight of at least one solvent, so that the glass transition temperature achieved for the adhesive agent is in the area 10°–18° C.

10 Claims, No Drawings

ADHESIVE AGENT FOR ADHERING AN OBJECT TO ITS BASE

This is a filing under 35-USC 321 of Pat./FI 95/00452 filed 24 Aug. 1995.

The present invention relates to an adhesive agent for adhering an object manufactured in a multi-stage process to its base for the duration of at least one process step.

When manufacturing objects to a desired purpose for instance of a ceramic or semiconductor material, the production of these objects includes a step or steps where the object under treatment is advantageously attached to its base in order to perform the treatment as advantageously as possible. In the production of this kind of object, the advantageous adhering step to the base is, however, usually followed by a step or steps where the object must be detached from its base and the adhesive agent removed from its surface. For instance, in order to carry out the polishing and cleaning of semiconductor products in an advantageous fashion, with respect to the smoothness and cleanness required thereby, the semiconductor products must be adhered to their base for the duration of the various processing steps. However, prior to the next process step, the semiconductor products must be cleaned so as to prevent the adhesive agent from accumulating an essentially thick layer on the rear surface of the semiconductor product. Therefore the agent used for adhering must have, in addition to a good adhesive capacity and good grip, also good solubility in the cleaning after the process step. Other properties required of this type of adhesive agent are liquidity and fluent applicability through a nozzle, because generally semiconductor products and ceramic objects are manufactured in large amounts.

The EP patent application 402,520 introduces an automatic adhering device for wafers, wherein the wafers are attached to their base by means of an adhesive wax for the duration of the wafer polishing step. In the adhesive wax, there is mixed some organic solvent in order to spread the adhesive wax as a smooth layer on the surface of the object to be adhered. Adhesive wax is fed through a nozzle onto the base prior to installing the wafer thereon. However, the said EP patent application 402,520 does not include any reference to the composition of the adhesive wax.

In adhering a semiconductor product to its base, there is generally used wax containing CFC compounds that are harmful to the earth's ozone layer as well as to the environment, for instance compounds commercially available under the trade mark FREON. Among these adhesives let us mention for example adhesives containing 1,1,1-trichloroethane (TCA) or trichloroethylene (TCE). In the removal of adhesive residues left on the surface of semiconductors, there are generally used solvents containing CFC compounds, among them the above mentioned TCA and TCE compounds.

From the Japanese patent application 03-203,981 there is known an adhesive agent employed for adhering wafers, the said agent avoiding the use of CFC compounds by using modified resin or a resin mixture as the main component of the adhesive agent. The employed resin is a tricyclic ring compound, such as abietic acid. This abietic acid is modified for instance by allowing it to react with maleic acid and by esterifying it, so that the acid value obtained for the modified resin is about 70. The obtained modified resin is further dissolved into an organic solvent while the content is within the region 1–50%.

In the above mentioned Japanese patent application 03/203,981, the original resin is highly modified in order to attain a low acid value. In naturally obtained resins, the acid value is within the region 160–180. By means of the acid value, it is possible to affect the adhesion of the adhesive agent, as well as its washability after the desired process step. Thus the modified resin suited in the adhesive agent according to the said Japanese patent application 03-203,981 must be strongly neutralized in order to attain the desired low acid value. The more the resin must be modified, the farther it is from an ecological product. This may cause unpredictable hazards to the environment of application.

The object of the present invention is to eliminate some of the drawbacks of the prior art and to achieve a novel, more versatile and more ecological adhesive agent to be used in the production of semiconductor products and ceramic objects, for instance in the polishing of a semiconductor product, which adhesive agent has an essentially high acid value, does not contain ecologically hazardous CFC compounds and can be dissolved without solvents containing CFC compounds, but has all the capacities required of an adhesive agent. The essential novel features of the invention are apparent from the appended patent claims.

The solid material used in the adhesive agent according to the invention is tall oil rosin, which is modified so that the acid value is in the region 115–145. The resin is further dissolved so that the adhesive agent contains 20–50, advantageously 30–40 parts in weight resin and 48–80, advantageously 58–70 parts in weight solvent. In the adhesive agent there can be added, when necessary, 0–2 parts in weight additives needed for adjusting the properties of the adhesive agent.

The tall oil rosin used in the adhesive agent according to the invention is advantageously obtained by distilling crude tall oil obtained from pulp industry, created as a side product from pulping pine wood. According to the invention, tall oil rosin, which is a tricyclic monocarboxyl acid, for instance a mixture of abietic acid and its isomers, having the CAS number 8052-10-6, can as such be used as the material of the adhesive agent according to the invention. In order to improve the properties of the resin for the adhesive agent, tall oil rosin is, however, advantageously modified for instance by disproportioration, partial dimerization and/or esterification by using a polyol, such as glycerol or pentaerythritol. The modification of the tall oil rosin advantageously adjusts the glass transition temperature and softening temperature of the adhesive agent. Likewise, by modifying the tall oil rosin, it is possible to affect both the grip of the adhesive agent in between desired materials in order to achieve a suitable polarity to ensure adhesion, and the washability of the adhesive agent when removing it advantageously prior to the next process step.

According to the invention, the solvent used in the adhesive agent is a solvent containing at least one of the following: turpentine, such as alpha pinene, aromatic hydrocarbon, such as xylene or toluene, ketone, such as acetone, and alcohol, such as ethanol. By means of the solvent, the adhesive agent turns liquid and easy to spread, and consequently the layer of adhesive agent on the surface object to be adhered becomes essentially smooth. When using a solvent mixture in the adhesive agent, the polarity and volatility of the adhesive agent are advantageously adjusted. Proper polarity enhances the formation of an essentially even adhesive agent layer on the base in the spreading stage, as well as the creation of an adhesive bond in between the base and the object to be adhered, whereas volatility is improved in order to remove the adhesive agent by advantageously adjusting the boiling point of the solvent mixture. The boiling point of the solvent mixture is advantageously adjusted within the region 60°–90° C., so that the solvent mixture contains two components in proportions by weight, depending on the said solvent components, within the region 75/25–25/75, advantageously in the region 60/40–40/60.

The adhesive agent according to the invention does not contain any ecologically hazardous or highly inflammable CFC compounds, and the adhesive agent can advantageously be removed for instance from the surface of a semiconductor product by some ordinary ammonium hydroxide solutions containing peroxides, without applying solvents containing CFC compounds. Thus the use of the adhesive agent according to the invention also is beneficial for a working environment.

The adhesive agent according to the invention is advantageously adjusted to have a composition where the acid value of the modified tall oil resin used in the adhesive agent is within the region 115–145, advantageously 130–145, while the softening point of the resin defined by the Ring & Ball method according to the ASTM standard E28–58T is in the area 68–78° C. In order to create an adhesive agent, solvent is added to this modified resin oil to obtain the glass transition temperature of the created mixture in the area 10°–18° C.

The composition of the adhesive agent according to the invention is further described in the examples below. The purpose of these examples is by no means to restrict the composition of the adhesive agent defined in the appended patent claims.

EXAMPLE 1

In order to manufacture the adhesive agent according to the invention, there was first formed a solvent mixture containing 35 parts by weight alpha pinene and 35 parts by weight acetone, when calculated of the final amount of adhesive agent. Into this solvent mixture, there was added 30 parts by weight resin of partially dimerized tall oil rosin, which was partly esterified with pentaerythritol and had an acid value of 115–130. The viscosity of the obtained adhesive agent was 3 mPas and glass transition temperature 16.5° C., so that the adhesive agent was advantageously readily spreadable at room temperature.

EXAMPLE 2

In order produce adhesive agent, there was first created a solvent mixture containing 32.5 parts by weight toluene and 32.5 parts by weight acetone, as calculated of the final amount of adhesive agent. Into this solvent mixture, there was added 35 parts by weight modified tall oil resin mentioned in Example 1 above, and the glass transition temperature measured for the created adhesive agent was 9.1° C. and viscosity 5 mPas.

EXAMPLE 3

In the production of the adhesive agent according to the invention, there was used a solvent mixture containing 32 parts by weight toluene and 32 parts by weight ethanol, as calculated of the final amount of adhesive agent. Into this solvent mixture, there was added 35 parts by weight partly dimerized tall oil rosin, having an acid value in the region 130–145, as well as 1 part by weight polyethylene glycol as an additive. The viscosity measured for the produced adhesive agent was 6 mPas and glass transition temperature 11.1° C.

We claim:

1. An adhesive agent for adhering an object produced in a multi-stage process to its base for the duration of at least one process step, characterized in that it contains 20–50 parts by weight of modified tall oil rosin with an acid value within the region 115–145 and 48–80 parts by weight of at least one solvent, so that the glass transition temperature of the adhesive agent is in the area 10–18° C.

2. An adhesive agent according to claim 1, characterized in that the tall oil rosin is modified by partial disproportioration.

3. An adhesive agent according to claim 1, characterized in that the tall oil rosin is modified by partial dimerization.

4. An adhesive agent according to claim 1, characterized in that the tall oil rosin is modified by esterifization.

5. An adhesive agent according to claim 1, characterized in that the employed solvent is a mixture containing two components from the group turpentine, aromatic hydrocarbon, ketone and alcohol.

6. An adhesive agent according to claim 1, characterized in that the employed solvent is a solvent mixture containing turpentine and alcohol.

7. An adhesive agent according to claim 1, characterized in that the employed solvent is a solvent mixture containing alpha pinene and acetone.

8. An adhesive agent according to claim 1, characterized in that the employed solvent is a solvent mixture containing toluene and acetone.

9. An adhesive agent according to claim 1, characterized in that the employed solvent is a solvent mixture containing toluene and ethanol.

10. An adhesive agent according to claim 1, characterized in that the employed solvent is a solvent mixture containing xylene and acetone.

* * * * *